United States Patent [19]

Bacher et al.

[11] Patent Number: 4,976,656

[45] Date of Patent: Dec. 11, 1990

[54] AUTOMOBILE, AND CORRESPONDING HYDROKINETIC COUPLING APPARATUS

[75] Inventors: Michel Bacher, Andilly; Jean E. Bionaz, Fontenay-sous-Bois, both of France

[73] Assignee: Valeo, Paris, France

[21] Appl. No.: 238,045

[22] Filed: Aug. 30, 1988

[30] Foreign Application Priority Data

Sep. 8, 1987 [FR] France .................. 87 12417

[51] Int. Cl.$^5$ .................. F16D 3/66; F16H 45/02; F16F 15/12
[52] U.S. Cl. .................. 464/68; 192/3.28; 192/106.2
[58] Field of Search .................. 192/3.28, 3.29, 3.3, 192/106.2; 464/68

[56] References Cited

U.S. PATENT DOCUMENTS

| | | | |
|---|---|---|---|
| 4,139,995 | 2/1979 | Lamarche | 192/106.2 X |
| 4,188,805 | 2/1980 | Fall et al. | 192/106.2 X |
| 4,484,898 | 11/1984 | Kohno | 192/106.2 |
| 4,577,742 | 3/1986 | Saida | 464/68 |
| 4,722,715 | 2/1988 | Bill et al. | 192/106.2 X |
| 4,809,830 | 3/1989 | Schierling et al. | 192/3.29 |

FOREIGN PATENT DOCUMENTS

| | | |
|---|---|---|
| 0082589 | 6/1983 | European Pat. Off. . |
| 0110553 | 6/1984 | European Pat. Off. . |
| 2518202 | 6/1983 | France . |
| 2066416 | 7/1981 | United Kingdom . |

Primary Examiner—Rodney H. Bonck
Attorney, Agent, or Firm—Charles E. Brown; Charles A. Brown

[57] ABSTRACT

The invention is concerned with a torsion damping device, of the kind comprising two coaxial parts which are mounted so as to be rotatable with respect to one another against the action of circumferentially acting resilient members, with a phasing ring operatively connected between the resilient members so that the resilient members are effectively mounted for operation in series with each other. The phasing ring is maintained in a radial relationship by a plurality of pads, which being separate from each other, are spaced apart circumferentially, with each pad being individually secured to an appropriate one of the coaxial parts. The pads are preferably made from a synthetic material. The invention is especially applicable to clutches of the lock up type for use in hydrokinetic coupling apparatus for automobiles.

13 Claims, 3 Drawing Sheets

AUTOMOBILE, AND CORRESPONDING HYDROKINETIC COUPLING APPARATUS

FIELD OF THE INVENTION

The present invention relates generally to torsion damping devices of the kind comprising, in a known manner, two coaxial parts which are mounted to be rotatable with respect to each other against the action of circumferentially acting resilient members.

In addition, and more particularly, the present invention relates to the case in which, in order to ensure that at least some of the resilient members are so mounted that they effectively operate in a series relationship with each other, and in this way to obtain, at reduced cost and with reduced mass, a relatively large angular displacement for a relatively high transmitted torque, there is provided at least one ring, hereinafter referred to for convenience as a phasing ring, which has on at least one of its peripheries at least one arm projecting radially and circumferentially interposed between two of the resilient members.

BACKGROUND OF THE INVENTION

The type of torsion damping device described above is for example used in clutches of the kind commonly referred to as "lock up" clutches, forming part of the hydrokinetic coupling apparatus, of the kind with which automobiles having automatic or semi-automatic transmission may be provided.

An example of such an arrangement is the lock up clutch which is the subject of the French Patent Application No. 2 518 202.

The resilient members which are provided are distributed in two groups, with the phasing ring, which is also freely rotatable, transmitting the forces exerted by each of the resilient members on a first one of these groups to the corresponding resilient member of the other group, thus providing the series mounting which is required.

In operation, the phasing ring is, in addition, subjected to the centrifugal forces to which the resilient members are also subjected.

If the resilient members are regularly spaced apart circumferentially, if they are all subjected to exactly the same centrifugal force, and if they all develop exactly the same thrust force, the resultant of the corresponding radial forces is then zero. The phasing ring, which would be in perfect equilibrium, would not be urged into a radial displacement at all.

In practice, the above is rarely true, so that, since the resultant of the radial forces is in fact not zero, the phasing ring is subjected to a certain amount of radial displacement.

In order that such displacement does not interfere with the operation of assembly, it is necessary to associate with the phasing ring some kind of retaining means which are adapted to maintain the phasing ring radially, in some convenient manner, with respect to the axis of the assembly.

One of the coaxial parts concerned includes a rotatable plate, which hereinafter will be referred to as a hub plate, while the other coaxial part includes two rings which will hereinafter be referred to as guide rings. The guide rings are arranged on either side of the hub plate, and are spaced at a distance from the latter. The guide rings are secured at intervals to each other by fastenings. In order to achieve this, it has been proposed, in French Patent Application No. 2 518 202 and mentioned above, that this radial restraint of the phasing ring should be obtained by means of the guide rings, with the latter constituting, in any suitable way, a casing which is circumferentially continuous around the phasing ring.

It follows from this that it is necessary to give to at least one of the guide rings a particular configuration, with an axial wall of which is circumferentially continuous. This increases the cost of the assembly.

In addition, the guide rings are also adapted to provide abutment means for the resilient members, and it is therefore necessary that the rings shall be of metal. Since the same is true for the phasing ring, contact between the phasing ring and the guide rings is necessarily in the form of metal to metal contact.

Now, it is preferable to avoid such metal to metal contact, since this can give rise to tearing of the metal and lead to malfunctioning.

SUMMARY OF THE INVENTION

A general object of the present invention is to provide an arrangement which will allow the above difficulty to be overcome in a simple manner, and which will in addition lead to other advantages.

In more specific terms, a primary object of the invention is to provide a torsion damping device of the kind described above, in which the retaining means for the phasing ring comprise a plurality of pads, which are separate from each other and circumferentially spaced from each other, with each of the pads being individually secured to one of the coaxial parts.

Further objects of the invention are to provide a lock up clutch for a torsion damping device, and to provide a corresponding hydrokinetic coupling device.

The following description, which is given by way of example only and with reference to the accompanying diagrammatic drawings, will afford a better understanding of how the invention may be put into practice.

DESCRIPTION OF A PREFERRED EMBODIMENT OF THE INVENTION

Figure 1:
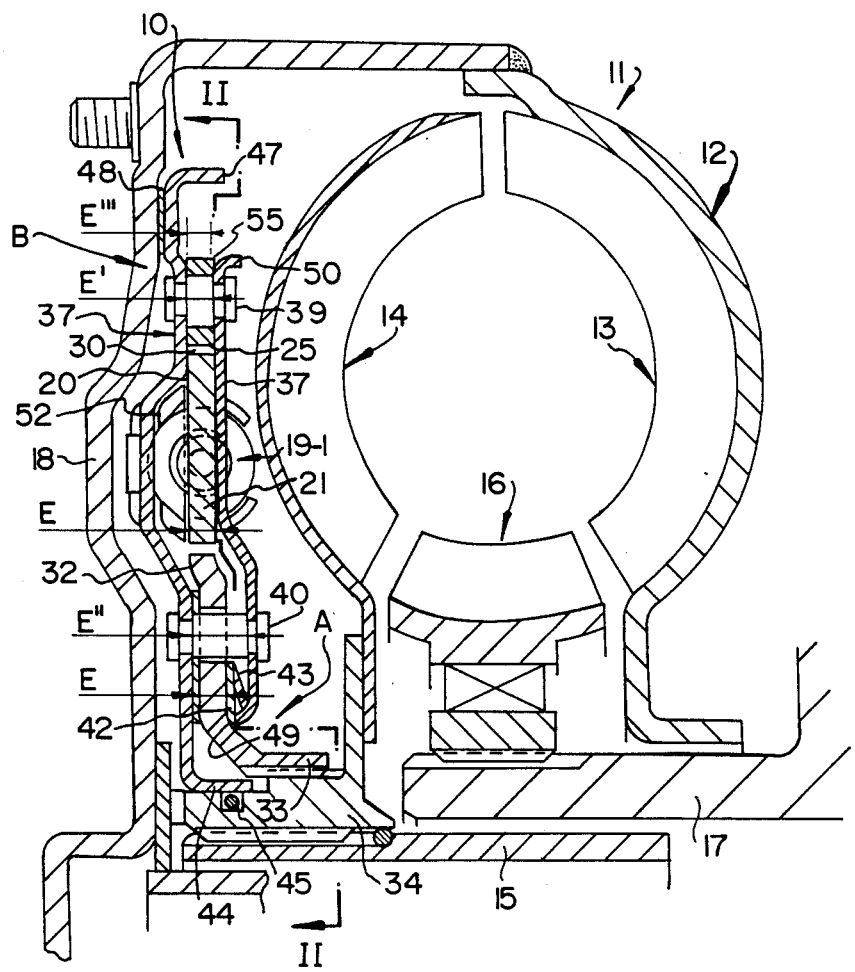
FIG. 1 is a view in axial cross section, taken on the broken line I—I in FIG. 2, of a lock up clutch, depicted as part of a hydrokinetic coupling device of the kind typical of the equipment for which it is adapted.
Figure 3:
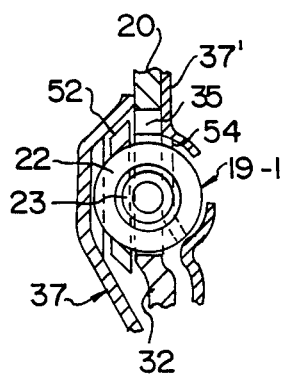
FIG. 3 is another partial view of the same clutch, taken in axial cross section on the line III—III in FIG. 2.

As shown in FIG. 1, in which it has been shown in bold lines, the lock up clutch 10, which incorporates a torsion damping device according to the invention, is adapted for use with a hydrokinetic coupling device 11 which is shown in less bold lines.

In the embodiment shown, this hydrokinetic coupling device 11, which is adapted for use in an automobile, is a torque converter disposed within a casing 12, which is arranged to be connected to a first shaft for rotation therewith. This first, or driving, shaft consists, in the present example, of the output shaft or crankshaft of the engine of the automobile. The torque converter comprises an impulse wheel 13, a turbine wheel 14 and a reaction wheel 16. The impulse wheel 13 is connected to the casing 12 for rotation therewith, while the turbine wheel 14 is connected with a second shaft 15 for rotation therewith. Shaft 15, which is a driven shaft, consists in the present example of the input shaft of the gearbox of the automobile. The reaction wheel 16 is carried by the fixed tubular housing 17 which surrounds the input shaft in the usual way, with a free wheel interposed in known manner.

The lock up clutch 10 is operatively connected between the turbine wheel 14 and the cross wall 18 of the casing 12 on the opposite side of the latter from the torque convertor.

Again in known manner, the clutch 10 incorporates a torsion damping device which generally comprises two coaxial parts A and B, which will be described in greater detail hereinafter. The coaxial parts A and B are mounted so as to be rotatable with respect to each other against the action of circumferentially acting resilient members 19. In order to mount at least certain of these circumferentially acting resilient members 19 in such a way that, in operation, they will act effectively in series with each other, at least one ring 20 is provided. The ring 20 will be referred to here for convenience as the phasing ring. The phasing ring 20 extends annularly around the axis of the assembly, and has at least one arm 21 projecting radially inwardly and interposed circumferentially between two of the circumferentially acting resilient members 19.

In the embodiment shown in the drawings, there are six of these circumferentially acting resilient members 19, all of which are disposed on a common pitch circle of the assembly. The members 19 are disposed around this pitch circle at regular intervals. The members 19 are generally divided into two groups, namely a first group of three circumferentially acting resilient members 19-1, and a second group of three circumferentially acting resilient members 19-2, the members of each of the groups being arranged alternately with those of the other.

For convenience, these members will be indiscriminately referred to in this description by the general reference numeral 19, whenever it is not necessary to identify the particular group to which it belongs.

These circumferential acting resilient members 19 all extend substantially tangentially with respect to the pitch circle along which they are disposed, and, in this embodiment, they are each formed from two coil springs 22 and 23, which are arranged coaxially one inside the other.

With this arrangement, the phasing ring 20 has three of the arms 21 projecting radially therefrom, with each of these arms 21 being circumferentially interposed between a circumferentially acting resilient member 19-1 of the first group and the corresponding circumferentially acting resilient member 19-2 of the second group.

The arms 21 of the phasing ring 20 extend in radial projection from the inner periphery of the ring, and for the purpose of retaining the circumferentially acting resilient members 19, each of the arms 21 has at its end (in these embodiments) two lugs 24 which extend circumferentially in opposite directions from each other.

The phasing ring 20 has, according to the arrangements provided by the invention, and for reasons which will appear later herein, recesses 25 on its outer periphery. It follows from this that the phasing ring 20 has a first set of shoulders 26T and 26R extending radially, each of which is defined respectively by radial flanks which form the ends of each of the recesses 25, considered in the circumferential direction.

In the same way, the ring 20, in accordance with the arrangements provided by the invention, and for reasons which will appear later herein, has recesses 28 in its inner periphery. There are the same number of recesses 28 as there are arms 21, and each of the former extends between two respective ones of the arms. Consequently the phasing ring 20 has a second set of radially extending shoulders 29T and 29R, each of which is defined by one of the radial flanks which define the corresponding end, considered in the circumferential direction, of an associated recess 28.

In practice, the number of recesses 25 is equal to the number of recesses 28, and they are arranged alternately with each other. Thus the radial shoulders 26T and 29T are back to back, so that they then circumferentially face in opposite directions with respect to each other, while the same is true for the shoulders 26R and 29R.

Because of the presence of these recesses 25 and 28, alternately in the circular direction, first on one of the peripheries of the phasing ring 20 and then on the other ring 20 has a zigzag form circumferentially.

In practice, and as shown, the base edges 30 and 31 of these recesses 25 and 28 may extend substantially along a common pitch circle.

The coaxial part A of the torsion damping device, which forms part of the lock up clutch 10 according to the invention, also includes a rotatable plate 32, which is herein referred to for convenience as the hub plate and which, like the phasing ring 20, extends annularly around the axis of the assembly. The hub plate 32 has a cylindrical flange 33 projecting axially from its inner periphery, so that the flange 33 forms a hub by means of which the hub plate is induced to rotate, for example by being mounted on splines, such as those shown in the drawing, on the hub 34 of the turbine wheel 14.

As its outer periphery, the hub plate 32 has arms 35 projecting radially at intervals. The arms 35 are equal in number to the arms 21 of the phasing ring 20, and are alternated with the arms 21 around the circumference. In this way each of the arms 35, like each of the arms 21, is circumferentially interposed individually between two circumferentially acting resilient members 19, namely a circumferentially acting resilient member 19-1 of the first group and a circumferentially acting resilient member 19-2 of the second group.

As can be seen from the drawings, the arms 35 lie opposite to the recesses 28 in the phasing ring 20, and each one has at its free end two lugs 36T and 36R for retaining the circumferentially acting resilient members 19. These lugs are disposed radially at substantially the same level as the radial shoulders 29T and 29R of the phasing ring 20, and extend circumferentially in opposite directions to each other, the lug 36T extending towards the shoulder 29T and the lug 36R extending towards the shoulder 29R.

In spite of the relative positioning of the arms 35 with the arms 21 of the phasing ring 20, the hub plate 32 extends radially over the whole of the interior of the phasing ring 20. In other words, the phasing ring extends radially entirely around and outside the hub plate 32.

For reasons of economy, and as shown in the drawings, it can be arranged that the phasing ring 20 and the hub plate 32 have the same axial thickness E, so that they can be manufactured from the same sheet.

Whether or not the latter is the case in a particular embodiment, if follows from the foregoing that each of the circumferentially acting resilient members 19 extends, in operation, individually between two arms, namely an arm 21 of the phasing ring 20 and an arm 35 of the hub plate 32.

In conjunction with this, the coaxial part B of the torsion damping device which is incorporated in the lock up clutch 10 according to the invention includes two rings 37 and 37', which are referred to herein for convenience as guide rings, and which are each disposed respectively on either side of the hub plate 32 at a distance from the latter. The guide rings 37 and 37' extend annularly, like the hub plate 32, around the axis of the assembly, and are fixed to each other by suitable fastenings at intervals.

These fastenings comprise, first of all, fasteners 39, which extend into the region of the outer periphery of the guide rings 37 and 37', radially outside the phasing ring 20.

Secondly, the fastenings comprise fasteners 40, which extend into the region of the inner periphery of the guide rings 37 and 37', and which are perpendicular to the hub plate 32. The fasteners 40 extend axially through the hub plate 32 via arcuate slots 41 which are formed for this purpose in the latter.

In both cases these fasteners are provided with sleeves having a circular transverse cross section, which extend substantially axially and which are riveted at their ends on to the guide rings 37 and 37'. By means of transverse shoulders, these sleeves constitute spacers for the guide rings 37 and 37'.

In practice, the distance E' separating the transverse shoulders of the fasteners 39 in question from each other, and therefore the spacing thus imposed on the guide rings 37 and 37' at the level of these fasteners 39, is slightly greater than the axial thickness E of the phasing ring 20 and of the hub plate 32, so as to avoid any contact between the phasing ring 20 and the guide rings 37 and 37'.

However, the distance E" separating the corresponding shoulders of the fasteners 40 from each other, and thus the spacing between the guide rings 37 and 37' at the level of these fasteners 40, is much greater than the distance E' mentioned above.

In the spaces thus provided, two friction rings are provided. These comprise: a first friction ring 42 on one side of the hub plate 32, this friction ring being inserted axially between the hub plate 32 and the corresponding guide ring 37 or 37', which in this case is the guide ring 37; and a second friction ring 42 with an axially acting resilient ring 43, both on the other side of the hub plate from the first friction ring 42. The rings 42 and 43 are inserted axially between the hub plate 32 and the other one of the guide rings 37 and 37' (in this case the guide ring 37'). The ring 43 is in practice a resilient ring of the Belleville washer type or a corrugated spring washer.

Since the torsion damping device according to the invention is adapted to be applied in a lock up clutch 10, it is possible to arrange for it to be applied to the interior of a piston.

Preferably, and as shown in the drawings, the guide ring 37, which is the guide ring disposed beside the cross wall 18 of the casing 12, is arranged in such a way as to constitute this piston.

The guide ring 37 is therefore made thick, and has, projecting axially from its inner periphery, a sleeve portion 44 by which it is slidingly engaged on the hub 34 of the turbine wheel 14, with a sealing joint 45 disposed in an annular groove with which the hub 34 is provided for this purpose, thus ensuring that this sliding mounting is leaktight.

The guide ring 37 constituting a piston may also have an axial flange 47 projecting axially from its outer periphery for strengthening purposes.

In a manner known per se, the guide ring 37 is adapted to be fixed to the cross wall 18 of the casing 12 by means of friction, so as to be rotatable with the casing. For this purpose, it is provided with a friction ring 48 in the region of its outer periphery, on that one of its faces which is directed towards the cross wall 18.

The guide ring 37' has a radial length smaller than that of the guide ring 37.

As can be seen from the Figures, the guide ring 37' may have axially extending flanges, respectively 49 and 50, for strengthening purposes, with these flanges projecting axially from its inner and outer peripheries.

In the embodiment shown in FIGS. 1 to 4, these flanges 49 and 50 are axially directed in opposite directions with respect to each other, with the flange 50, i.e. the one on the outer periphery, being axially directed in the direction away from the cross wall 18 of the casing 12.

In a manner known per se, the guide rings 37 and 37' are arranged to act circumferentially on the circumferentially acting resilient members 19, and for this purposes they are provided with abutment means. In the guide ring 37, which is thick, these comprise stop pieces 52, which are attached to the guide ring 37 by any convenient means, for example by bonding as shown in the drawings. The stop pieces 52 overlap the arms 35 of the hub plate 32, trapping the circumferentially acting resilient members 19 in pairs.

The stop pieces 52 have generally the same shape as the arms 35.

They thus have two abutment faces 52T and 52R, which comprise an abutment face 52T, for abutting engagement with the circumferential end of a circumferentially acting resilient member 19-1 which is in contact with the adjacent one of the arms 35 of the hub plate 32, and an abutment face 52R at the opposite circumferential side of the stop piece. The face 52R is arranged for abutting engagement with the corresponding circumferentially acting resilient member 19-2 which also makes contact with the adjacent arm 35.

These stop pieces 52 also have lugs for holding the springs radially in place.

In the guide ring 37', which is engaged on the circumferentially acting resilient members 19 by virtue of apertures 54 (FIG. 3), the corresponding abutment faces are constituted by substantially radial edge portions comprising the circumferential ends of these apertures 54.

In a modification, the guide ring 37' may, like the guide ring 37, be thick, and may have stop pieces identical with the stop pieces 52 of the guide ring 37.

In the rest position of the assembly, the abutment surfaces which are thus provided on the guide rings 37 and 37' for the circumferentially acting resilient members 19 are aligned with those which are correspondingly formed on the arms 35 of the hub plate 32.

With the phasing ring 20 which extends radially outside the circumferentially acting resilient members 19, there are associated retaining means for ensuring that the phasing ring 20 is retained radially with respect to the axis of the assembly.

In accordance with the invention, these retaining means comprise a plurality of pads 55 which are separate from each other and which are spaced apart circumferentially from each other. Each of the pads 55 is individually secured to one of the coaxial parts A and B.

These pads may in practice be of synthetic material, and in the embodiment shown in the drawings, they are secured to the coaxial part B.

For securing the pads 55 to the coaxial part B, the pads, provided in accordance with the invention, are each individually in engagement with at least one of the fasteners 39 which connect together the guide rings 37 and 37' forming part of the coaxial part B.

In the embodiment shown in FIGS. 1 to 4, at least one of these pads 55, and in practice each of them, is in engagement with two fasteners 39 circumferentially spaced apart from each other, and in practice this means two adjacent fasterners 39.

In practice, in this embodiment, the pads 55, in order to be in engagement with such fasteners 39, are engaged by means of holes 56, of closed contour, on the fasteners 39, with one of the latter being provided for each hole 56.

The pads 55 are thus inserted axially between the two guide rings 37 and 37'.

Their thickness E" is either equal to, or less or greater than, the distance separating the transverse shoulders of the fasteners 39 from each other, but it should preferably always be slightly greater than the thickness of the phasing ring 20, so as to avoid any contact between the latter and the guide rings 37 and 37'.

In practice, in order to reduce the amount of material distributed over the diameter of the assembly, the pads 55, when employed as described above, each extend radially into one of the recesses 25 of the phasing ring 20. In the embodiment shown in the drawings, the number of pads 55 is equal to the number of the recesses 25 in the phasing ring 20.

More precisely, in the embodiment shown, there are thus three pads 55, with one to each recess 25 in the phasing ring 20.

It further results from the relative radial engagement of the pads 55 in the recesses 25 of the phasing ring 20, that at least one of them, and in practice each one of them, has radial shoulders 58T and 58R at its ends, these shoulders being in practice defined by the ends. The shoulders 58T and 58R are at least partly disposed radially at the same level as the shoulders 26T and 26R of the phasing ring 20, in such a way that the pads 55 are thus enabled to cooperate circumferentially in abutting relationship with the latter.

In practice, the pads 55 which are provided according to the invention lie radially over the surface portion of the phasing ring 20 at the outer periphery of the latter, that is to say at its periphery having the greatest diameter. In other words, they lie on the part of this surface portion which is formed by the base 30 of the recesses 25 in which they are radially engaged.

In the embodiment shown in FIGS. 1 to 4, the pads 55 lie in this way, radially on the phasing ring 20, only in a single abutment zone 60, the circumferential length of which is less than the circumferential length of the pads themselves. The zone 60 is constituted by the surface of a projecting portion 61 which is provided for this purpose on the corresponding radial endge of each pad, in the central zone of the latter, and which extends circumferentially, intermediately between the corresponding fasteners 39 and substantially in line with the corresponding arm 21 of the phasing ring 20.

In the description that follows, it will first of all be assumed that, in the rest configuration of the assembly, and so far as this applies to the embodiment shown in FIGS. 1 to 4, the circumferential distance D1 between one radial shoulder 26T of the phasing ring 20, on the one hand, and the corresponding radial shoulder 58T of the pad 55 which is engaged radially in the recess 25 concerned of the phasing ring 20, on the other hand, is substantially equal (measured angularly) to the circumferential distance D2 between one radial shoulder 29T of the phasing ring 20, on the one hand, and the free end of the corresponding lug 36T of the arm 35 concerned of the hub plate 32 on the other hand. See FIG. 2.

It will also be assumed hereinafter that the normal direction of the assembly in service is that shown by an arrow F1 in FIG. 2.

Finally, in order to simplify the description, it will be assumed that, in the relative angular displacement which is developed between the coaxial parts A and B constituting the lock up clutch 10 according to the invention, the driven part A, and thus the hub plate 32, are fixed.

Figure 2:
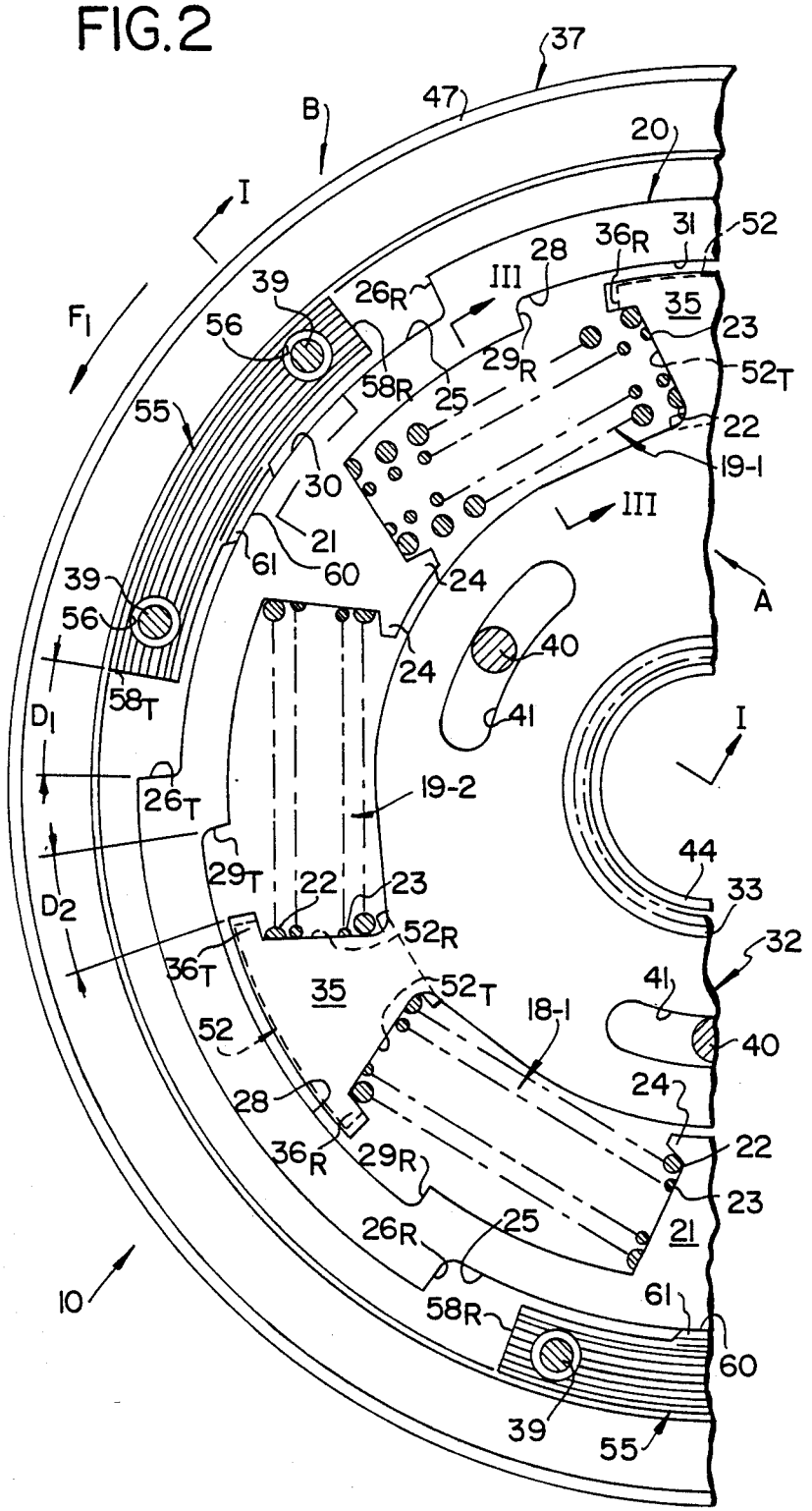
FIG. 2 is a partial view in elevation, taken in cross section on the broken line II—II in FIG. 1, of the same lock up clutch which is shown in its rest position.

In operation, and in the mode of operation commonly referred to as the "upshift" mode, in which the coaxial part B tends to drive the coaxial part A, the whole action takes place as though the coaxial part B were rotating about the axis of the assembly, according to the arrow F1 in FIG. 2.

During the course of this rotation, the circumferentially acting resilient members 19 become progressively compressed. In the case of the circumferentially acting resilient members 19-1 of the first group, which are those immediately upstream in the direction of rotation of the assembly indicated by the arrow F1 in FIG. 2, this compression is induced directly by the thrust exerted by the stop pieces 52 of the guide ring 37 through the abutment face of the latter and the abutment faces of the apertures in the guide ring 37'. In the case of the circumferentially acting resilient members 19-2 of the second group, which are those that are the more downstream in the direction of rotation mentioned above, the compression is induced indirectly, by the thrust exerted by the arms 21 of the phasing ring 20. The phasing ring 20, which is also free in rotation about the axis of the assembly, is itself urged in the said direction of rotation by the circumferentially acting resilient members 19-1 of the first group mentioned above.

Figure 4:
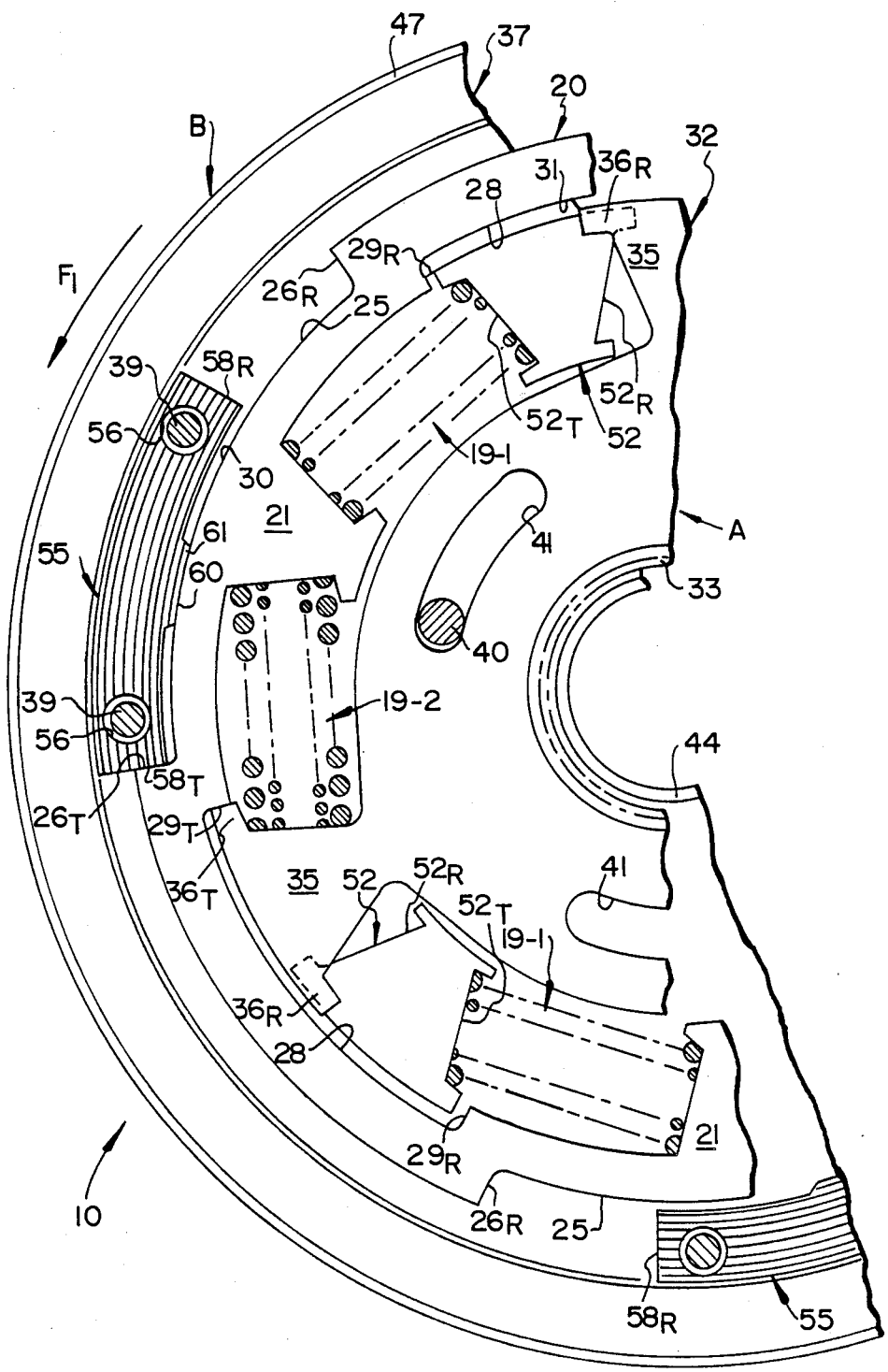
FIG. 4 is a partial view in elevation, taken in cross section and similar to that seen in FIG. 2 but showing a configuration of the lock up clutch concerned in operation.

This relative rotation of the coaxial part B, with respect to the coaxial part A, continues until the situation shown in FIG. 4 is reached. In this condition, the angular distance D1 has been reduced to zero, and the pads 55 engage through their radial shoulders 58T against the corresponding radial shoulder 26T of the phasing ring 20.

In association with this, and having regard to the foregoing, the angular distance D2 is also reduced to zero, in such a way that the phasing ring 20 itself engages, through its radial shoulders 29T, on the corresponding lugs 36T of the arms 35 of the hub plate 32.

The circumferentially acting resilient members 19 are thus all simultaneously taken out of use, and from this point onwards there is a positive driving action on the hub plate 32 through the pads 55 and via the phasing ring 20. When an excessive torque occurs, the coaxial part A is therefore driven positively by the coaxial part B.

As will be noted, this positive driving action is achieved by means of the pads 55 which are provided in accordance with the invention, in such a way that, when it occurs, the coil springs constituting the circumferentially acting resilient members 19 may advantageously not have their coils touching each other, while similarly the fasteners 40 remain spaced from the corresponding circumferential ends of the slots 41 through which they pass.

Figure 5:
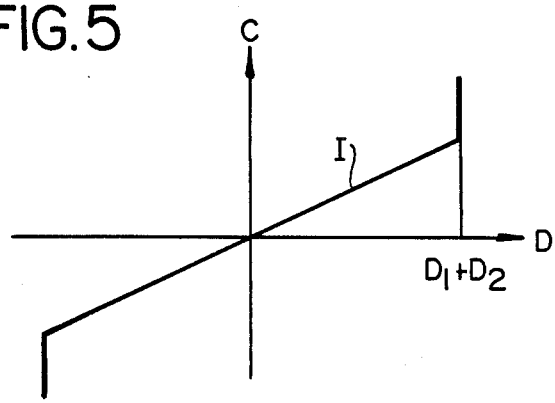
FIG. 5 is a diagram illustrating the operation of this lock up clutch.

In the diagram shown in FIG. 5, the abscissa indicates the angular displacement between the coaxial parts A and B, while the ordinate represents the torque transmitted from one to the other of the latter. The relationship is expressed by a simple straight line I which, passing through the origin, has a gradient which is proportional to the stiffness of the totality of the circumferentially acting resilient members 19 employed.

However, if the transmitted torque is reversed, so that operation assumes the mode commonly referred to as the "downshift" mode, in which it is the driven coaxial part A which tends to drive the driving coaxial part B, the process which then occurs is the inverse of the foregoing.

Notwithstanding the above, in order to simplify the description no account has been taken in the foregoing of the effect of hysteresis which are due, moreover, to frictional effects. This hysteresis effect leads, in a manner which is well known, to a difference occurring, for a given value of the angular displacement D, between the value of the transmitted torque in the downshift mode and that of the torque transmitted in the upshift mode.

What is claimed is:

1. A torsion damping device, of the kind comprising two coaxial parts, mounted for relative rotation against the action of circumferentially acting resilient members, and at least one phasing ring for mounting at least some of said resilient members so as to be operatively in a series relationship with each other, said at least one phasing ring having at least one radially projecting arm circumferentially interposed between two of said resilient means, and retaining means associated with said phasing ring adapted to ensure that said phasing ring is maintained radially with respect to the axis of the assembly, wherein said phasing ring retaining means comprises a plurality of pads, which are separate from each other and circumferentially spaced from each other, each of the said pads being individually secured to one of the said coaxial parts and wherein said pads lie radially on the surface portion of the phasing ring at the outer periphery thereof.

2. The torsion damping device according to claim 1, wherein said pads are made of synthetic material.

3. The torsion damping device according to claim 1, wherein at least one of said pads engages with the phasing ring only through a single zone of abutting engagement, the circumferential extent of which is less than the whole circumferential extent of the pad.

4. The torsion damping device according to claim 1, wherein at least one of said pads has a radial shoulder which is disposed at least partly radially at a common level with a first radial shoulder of the phasing ring, such that it is adapted to cooperate circumferentially in abutting relationship therewith.

5. The torsion damping device according to claim 4, wherein said pads are secured to one of the coaxial parts, and the phasing ring has a second radial shoulder whereby it is adapted to cooperate circumferentially in abutting relationship with the other of said coaxial parts, and in the rest condition of the assembly, the circumferential distance between its said first radial shoulder and the shoulder of at least one of said pads is, measured angularly, substantially equal to the circumferential distance between its second radial shoulder and the corresponding portion of said other coaxial part.

6. The torsion damping device according to claim 1, wherein one of the coaxial parts comprises a rotatable hub plate, while the other of said coaxial parts comprises two guide rings disposed on either side of said hub plate and which are spaced therefrom, said guide rings being secured to each other at intervals by means of fastenings, and wherein said phasing ring has a zigzag form circumferentially and has the same axial thickness as the hub plate, so that they may be made from the same sheet of material.

7. A torsion damping device, of the kind comprising two coaxial parts, mounted for relative rotation against the action of circumferentially acting resilient members, and at least one phasing ring for mounting at least some of said resilient members so as to be operatively in a series relationship with each other, said at least one phasing ring having at least one radially projecting arm circumferentially interposed between two of said resilient means, and retaining means associated with said phasing ring adapted to ensure that said phasing ring is maintained radially with respect to the axis of the assembly, wherein said phasing ring retaining means comprises a plurality of pads, which are separate from each other and circumferentially spaced from each other, each of the said pads being individually secured to one of the said coaxial parts one of said coaxial parts comprising a rotatable hub plate with the other of said coaxial parts comprising two guide rings disposed on either side of said hub plate and being spaced therefrom, said guide rings being secured at intervals to each other by means of fastening adapted to secure them to the appropriate coaxial part, and wherein each of said pads in individually in engagement with at least one of said fastenings.

8. The torsion damping device according to claim 7, wherein at least one of said pads is in engagement with two of said fastenings circumferentially spaced from each other.

9. The torsion damping device according to claim 7, wherein at least one of said pads is in engagement with only one of said fastenings.

10. The torsion damping device according to claim 7, wherein a said pad is engaged through a hole of closed contour with a said fastening.

11. The torsion damping device according to claim 7, wherein said pads are interposed axially between the two guide rings so as to constitute a spacer, and have an axial thickness which is slightly greater than the thickness of the phasing ring.

12. The torsion damping device according to claim 7, wherein said pads are made of synthetic material.

13. A torsion damping device, of the kind comprising two coaxial parts, mounted for relative rotation against the action of circumferentially acting resilient members, and at least one phasing ring for mounting at least some of said resilient members so as to be operatively in a series relationship with each other, said at least one phasing ring having at least one radially projecting arm circumferentially interposed between two of said resilient means, and retaining means associated with said phasing ring adapted to ensure that said phasing ring is maintained radially with respect to the axis of the assembly, wherein said phasing ring retaining means comprises a plurality of pads, which are separate from each other and circumferentially spaced from each other, each of the said pads being individually secured to one of the said coaxial parts the phasing ring being provided with recesses which are formed alternately on respective ones of the outer and inner peripheries of said phasing ring, whereby the phasing ring is zigzag in circumferential shape.

* * * * *